US 11,979,668 B2

United States Patent
Guérin et al.

(10) Patent No.: US 11,979,668 B2
(45) Date of Patent: May 7, 2024

(54) HIGH DYNAMIC RANGE ANTI-GHOSTING AND FUSION

(71) Applicant: GoPro, Inc., San Mateo, CA (US)

(72) Inventors: Guillaume Matthieu Guérin, Chatillon (FR); Julien Caron, Guyancourt (FR); Miguel Marques, Bois d'Arcy (FR)

(73) Assignee: GoPro, Inc., San Mateo, CA (US)

( * ) Notice: Subject to any disclaimer, the term of this patent is extended or adjusted under 35 U.S.C. 154(b) by 379 days.

(21) Appl. No.: 17/299,470

(22) PCT Filed: Oct. 17, 2019

(86) PCT No.: PCT/US2019/056746
§ 371 (c)(1),
(2) Date: Jun. 3, 2021

(87) PCT Pub. No.: WO2020/117379
PCT Pub. Date: Jun. 11, 2020

(65) Prior Publication Data
US 2022/0030152 A1    Jan. 27, 2022

Related U.S. Application Data

(60) Provisional application No. 62/811,195, filed on Feb. 27, 2019, provisional application No. 62/793,096, (Continued)

(51) Int. Cl.
*H04N 23/81* (2023.01)
*G06T 5/50* (2006.01)
(Continued)

(52) U.S. Cl.
CPC ............... *H04N 23/81* (2023.01); *G06T 5/50* (2013.01); *G06T 5/70* (2024.01); *G06T 5/92* (2024.01);
(Continued)

(58) Field of Classification Search
CPC ...... H04N 23/741; H04N 23/80; H04N 23/90; H04N 23/95; H04N 23/951; H04N 23/955;
(Continued)

(56) References Cited

U.S. PATENT DOCUMENTS 9,019,402 B2    4/2015  Vrănceanu
9,613,408 B2 *  4/2017  Micovic ................... G06T 1/20
(Continued)

FOREIGN PATENT DOCUMENTS

EP             2297939 A1    3/2011

OTHER PUBLICATIONS

International Search Report Issued in Application No. PCT/US2019/056746, dated Feb. 5, 2020, 15 pages.
(Continued)

*Primary Examiner* — Paul M Berardesca
(74) *Attorney, Agent, or Firm* — Young Basile Hanlon & MacFarlane, P.C.

(57) ABSTRACT

Systems and methods are disclosed for high dynamic range anti-ghosting and fusion. For example, methods may include receiving images from image sensors in a linear domain, each image having different exposures or gains, blending luminance values at each pixel from each of the images to generate a blended image, selecting an useful image based on degree of useful information for a pixel, calculating a distance value from the images for the pixel, locating from a look-up table (LUT) an anti-ghosting weight using the useful image and the distance value for the pixel, proportionally applying the located anti-ghosting weight to the pixel for each of the input images to generate an output image, all being performed in the linear domain, and storing, displaying, or transmitting the output image based on at least the anti-ghosting weight.

20 Claims, 12 Drawing Sheets

Related U.S. Application Data filed on Jan. 16, 2019, provisional application No. 62/776,051, filed on Dec. 6, 2018.

(51) Int. Cl.
*G06T 5/70* (2024.01)
*G06T 5/92* (2024.01)
*G06T 7/90* (2017.01)
*H04N 23/741* (2023.01)

(52) U.S. Cl.
CPC ............ *G06T 7/90* (2017.01); *H04N 23/741* (2023.01); *G06T 2207/20208* (2013.01); *G06T 2207/20221* (2013.01)

(58) Field of Classification Search
CPC .. H04N 23/957; H04N 23/958; H04N 23/959; H04N 25/57; H04N 25/58; H04N 25/581; H04N 25/583; H04N 25/587; H04N 5/211; G06T 2207/20208
See application file for complete search history.

(56) References Cited

U.S. PATENT DOCUMENTS

| | | | |
|---|---|---|---|
| 2013/0028509 A1* | 1/2013 | Moon | G06T 5/009 382/218 |
| 2013/0314568 A1* | 11/2013 | Vranceanu | G06T 5/50 348/239 |
| 2014/0247985 A1 | 9/2014 | Park | |
| 2014/0307960 A1* | 10/2014 | Sharma | G06T 5/007 382/162 |
| 2022/0053117 A1* | 2/2022 | Patel | H04N 23/73 |

OTHER PUBLICATIONS

International Preliminary Report on Patentability for App. No. PCT/US2019/056746, dated Jun. 17, 2021, 12 pages.

* cited by examiner

HIGH DYNAMIC RANGE ANTI-GHOSTING AND FUSION

CROSS-REFERENCE TO RELATED APPLICATIONS

This application is a 371 of International Application No. PCT/US2019/056746, filed on Oct. 17, 2019, which claims priority to U.S. Provisional Application No. 62/776,051, filed on Dec. 6, 2018, U.S. Provisional Application No. 62/793,096, filed Jan. 16, 2019, and U.S. Provisional Application No. 62/811,195, filed Feb. 27, 2019, the entire contents of which are hereby incorporated by reference.

TECHNICAL FIELD

This disclosure relates to high dynamic range image generation.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view. The image stitching process may introduce distortions that depend on the objects appearing within the field of view of the camera and/or the relative positions and orientations of those objects.

SUMMARY

Disclosed herein systems and methods for high dynamic range anti-ghosting and fusion.

In a first aspect, a method includes receiving input images from image sensors in a linear domain, each input image having a different exposure time. The input images are aligned, in the linear domain, in luminance by applying a gain factor to appropriate input images so same objects with different exposure times have a same grey level. A blended image is generated, in the linear domain, by blending luminance values at each pixel from each of the aligned images. A useful image is determined, in the linear domain, by selecting which of the aligned images has useful information for a pixel. A differential luminance value is calculated, in the linear domain, from the aligned images for the pixel. An anti-ghosting weight is determined, in the linear domain, based on the useful image and the differential luminance value for the pixel. The determined anti-ghosting weight is proportionally applied, in the linear domain, to the pixel for each of the aligned images to generate an output image. The output image is stored, displayed, or transmitted based on at least the anti-ghosting weight. In an implementation, the method further includes regularizing, in the linear domain, the anti-ghosting weight for the pixel. In an implementation, the method further includes computing the luminance values for each pixel in each aligned image. In an implementation, the determining a useful image further includes using a threshold based on the gain factor and the blended image to determine the useful image. In an implementation, the useful image represents the aligned image that has a largest dynamic range for the pixel. In an implementation, when the useful image is multiple aligned images, the method further includes averaging luminance values from each of the aligned images. In an implementation, a luminance value for the pixel is from the useful image. In an implementation, the determining, in the linear domain, an anti-ghosting weight further includes accessing a look-up table (LUT) using a luminance value from the useful image and the differential luminance value to locate the anti-ghosting weight. In an implementation, the method further includes populating the LUT with anti-ghosting weights during image exposure. In an implementation, a number of entries in the LUT are delimited by a defined degree of interpolation between entries and real-time execution.

In a second aspect, a system includes image sensors configured to capture images and an image processor configured to receive the captured images. The image processor includes an anti-ghosting unit configured to determine an anti-ghosting weight based on a useful image and a differential luminance value for a pixel, where the useful image is a captured image that has a largest dynamic range for the pixel and the differential luminance value is calculated from the luminance values of the captured images, a blending unit configured to use the anti-ghosting weight to fuse the captured images into an output high dynamic range image, and the image processor further configured to store, display, or transmit the output high dynamic range image based on at least the anti-ghosting weight. In an implementation, the image processor further includes at least one alignment unit configured to normalize grey level of same objects in the captured images using gain factors. In an implementation, the image processor further includes a look-up table (LUT), the look-up table including anti-ghosting weights, where the anti-ghosting unit is further configured to access the LUT using a luminance value associated with the useful image and the differential luminance value to locate the anti-ghosting weight. In an implementation, the image processor further includes a luminance computation unit configured to compute the luminance values of the captured images and a luminance blending unit configured to generate a blended image based on the luminance values. In an implementation, the anti-ghosting unit is further configured to determine the useful image based on a gain factor and the blended image. In an implementation, the anti-ghosting weights are populated during image exposure.

In a third aspect, a method includes receiving input images from image sensors in a linear domain, each input image having different exposures or gains. A blended image is generated, in the linear domain, by blending luminance values at each pixel from each of the input images. A useful image is selected, in the linear domain, based on degree of useful information for a pixel. A differential luminance value is calculated, in the linear domain, from the input images for the pixel. An anti-ghosting weight is located, in the linear domain, from a look-up table (LUT) an using the useful image and the differential luminance value for the pixel. The located anti-ghosting weight is proportionally applied, in the linear domain, to the pixel for each of the input images to generate an output image. The output image is stored, displayed, or transmitted based on at least the anti-ghosting weight. In an implementation, the selecting the useful image further includes using a threshold based on a gain factor for luminance alignment and the blended image to select the useful image. In an implementation, the method further includes populating the anti-ghosting weights during image exposure. In an implementation, the degree of useful information is related to which an input image has a largest dynamic range.

In a fourth aspect, a method includes receiving input images from image sensors in a linear domain, each input image having a different exposure time. The input images are aligned, in the linear domain, in luminance by applying a gain factor to appropriate input images so same objects with different exposure times have a same grey level. A blended image is generated, in the linear domain, by blending luminance values at each pixel from each of the aligned images. A useful image is determined, in the linear domain, by selecting which of the aligned images has useful information for a pixel. In an implementation, a distance value is calculated, in the linear domain, from the aligned images for the pixel. An anti-ghosting weight is determined, in the linear domain, based on the useful image and the distance value for the pixel. An output image is generated by proportionally applying, in the linear domain, the determined anti-ghosting weight to the pixel for each of the aligned. The output image is stored, displayed, or transmitted based on at least the anti-ghosting weight. In an implementation, the method further includes regularizing, in the linear domain, the anti-ghosting weight for the pixel, and computing the luminance values for each pixel in each aligned image. In an implementation, the method further includes clipping the input images to a saturation value of an overexposed input image. In an implementation, the determining a useful image further includes using a threshold based on the gain factor and the blended image to determine the useful image. In an implementation, the method further includes denoising an underexposed input images to account for signal-to-noise fluctuations with an overexposed input image. In an implementation, the determining, in the linear domain, an anti-ghosting weight further includes accessing a look-up table (LUT) using a luminance value from the useful image and the distance value to locate the anti-ghosting weight. In an implementation, the method further includes populating the LUT with anti-ghosting weights during image exposure. In an implementation, the distance value is based on luminance properties of the input images. In an implementation, the distance value is based on colorimetric properties of the input images.

In a fifth aspect, a system includes image sensors configured to capture images and an image processor configured to receive the captured images. The image processor includes an anti-ghosting unit configured to determine an anti-ghosting weight based on a useful image and a distance value for a pixel, wherein the useful image is a captured image that has a largest dynamic range for the pixel and the distance value is calculated from defined image properties of the captured images, a blending unit configured to use the anti-ghosting weight to fuse the captured images into an output high dynamic range image and the image processor further configured to store, display, or transmit the output high dynamic range image based on at least the anti-ghosting weight. In an implementation, the image processor further includes a look-up table (LUT), the look-up table including anti-ghosting weights, where the anti-ghosting unit is further configured to access the LUT using a luminance value associated with the useful image and the distance value to locate the anti-ghosting weight. In an implementation, the image processor further includes a clipping unit configured to clip the captured images to a saturation value of an overexposed captured image. In an implementation, the image processor further includes a denoising unit configured to denoise an underexposed captured image to account for signal-to-noise fluctuations with an overexposed captured image. In an implementation, the defined image properties are luminance properties and colorimetric properties. In an implementation, the image processor further includes a regularization unit configured to spatially regularize anti-ghosting weights, the regularization unit including a combination of linear filters, rank filters and blenders.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
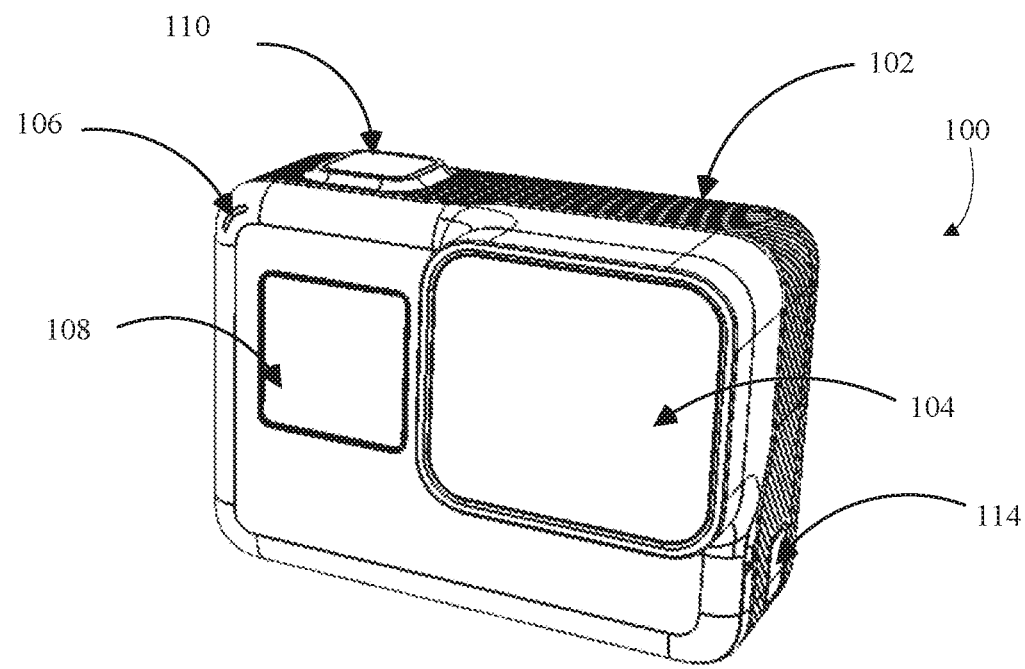
FIGS. 1A-D are isometric views of an example of an image capture device in accordance with embodiments of this disclosure.
Figure 1B:
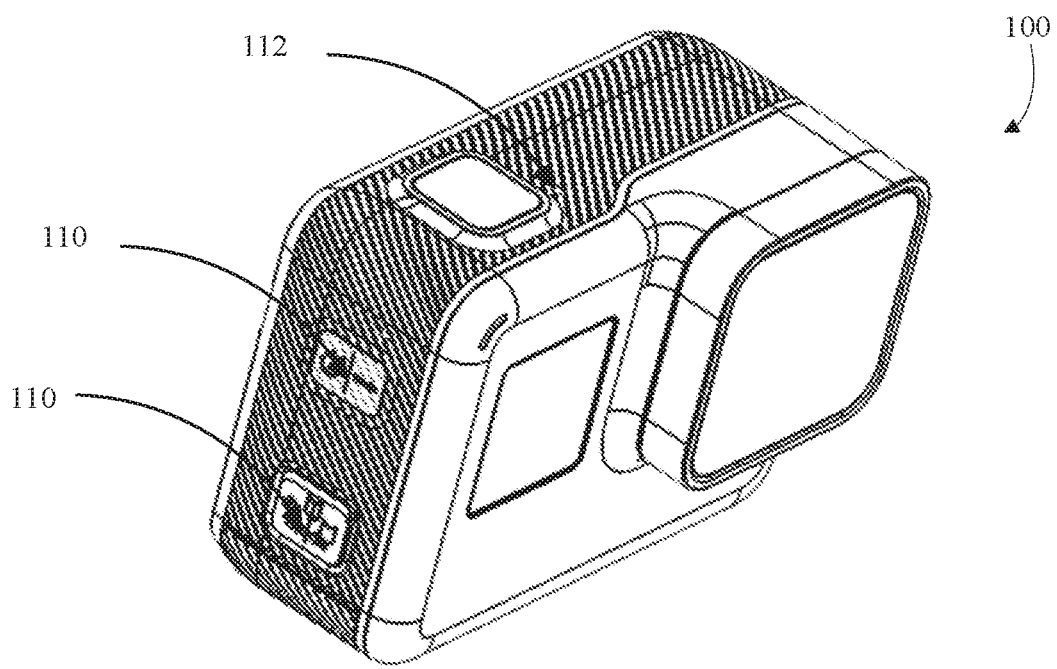
Figure 1C:
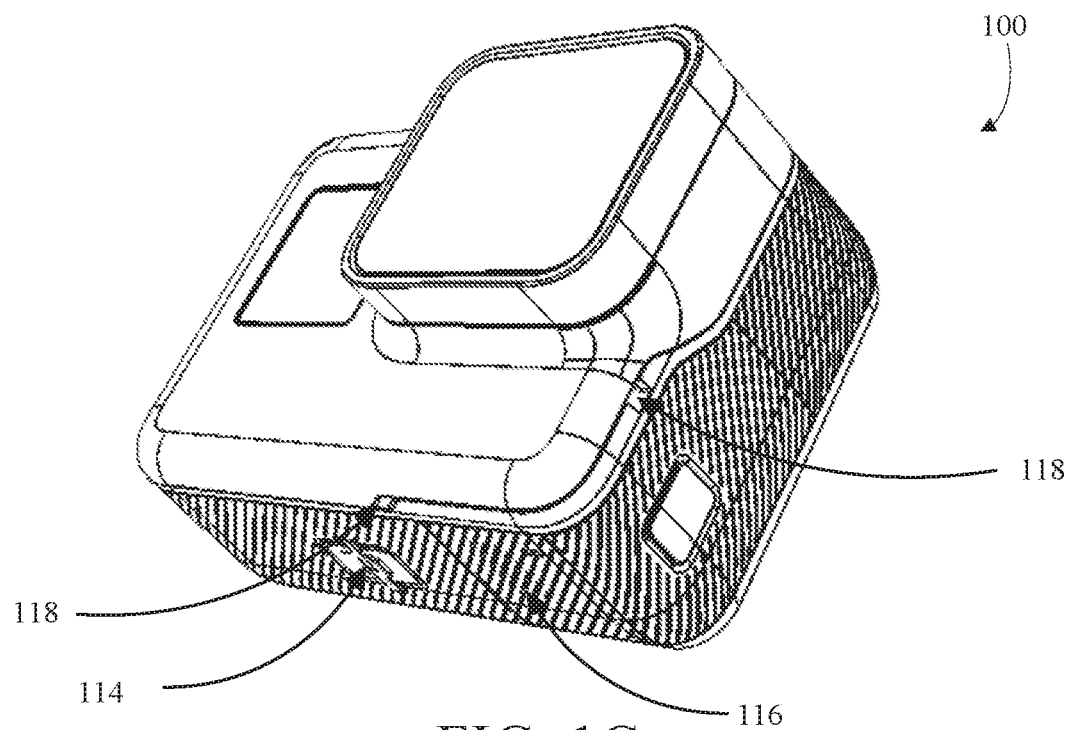
Figure 1D:
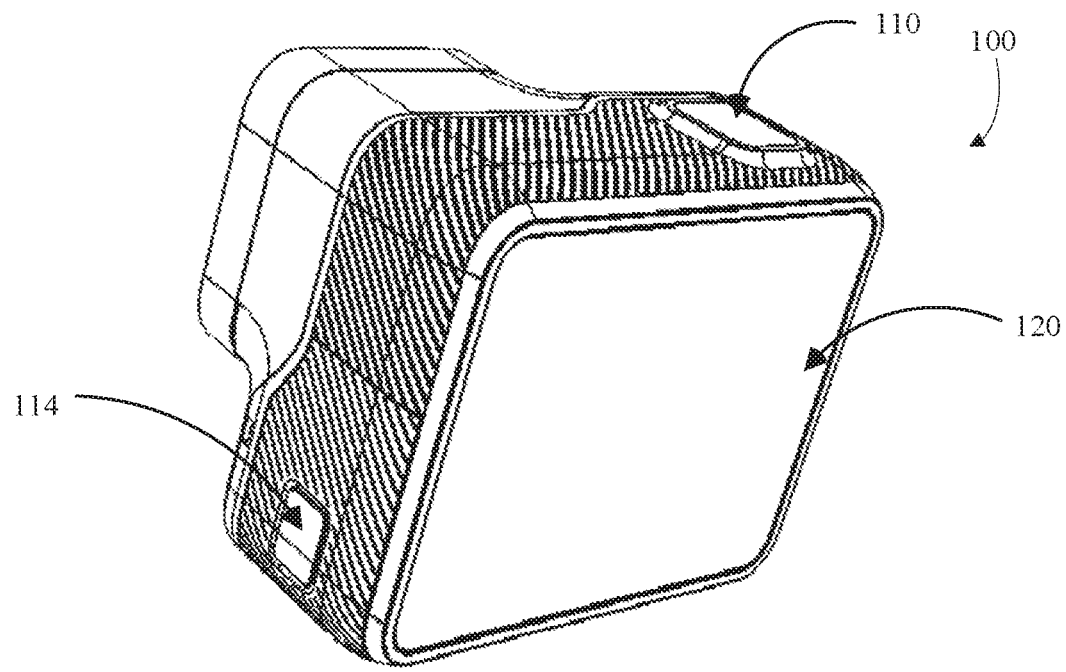

This document includes disclosure of systems, apparatus, and methods for cost-effective high dynamic range (HDR) anti-ghosting and fusion. An HDR image may be generated by combining or fusing multiple images of the same scene under varying exposure times, where each pixel being captured under a proper exposure in at least one of the multiple images. This technique however results in issues with the HDR image. For example, ghosts or ghosting artifacts may appear in the HDR image if objects are moving in the scene during image capture. That is, the moving objects may appear in different locations.

Anti-ghosting and fusion image signal processing techniques may be used to address the problem by minimizing, mitigating or eliminating the ghosting artifacts. In an implementation, anti-ghosting and fusion techniques are performed in the linear domain or on linear color space images.

These techniques may use one or more of the luminance, colorimetric, and the like properties or characteristics (collectively image properties or characteristics) of each of the multiple images. A weight may be determined from the image properties for each pixel. The weight proportionally allocates each of the images to an output image for that pixel. The output HDR image may be obtained as at least a luminance based weighted average of each image.

In an implementation, the luminance properties may be used to determine which of the images contains useful information relative to a pixel, area or region. These properties along with colorimetric properties may be used to determine consistency or relative exposures between the images, i.e. the presence of ghost artifacts. A function based on the usefulness of each image and the presence of ghost artifacts may be used to determine the weight. Accordingly, these techniques may combine the images by preserving or retaining the best parts of each exposure.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
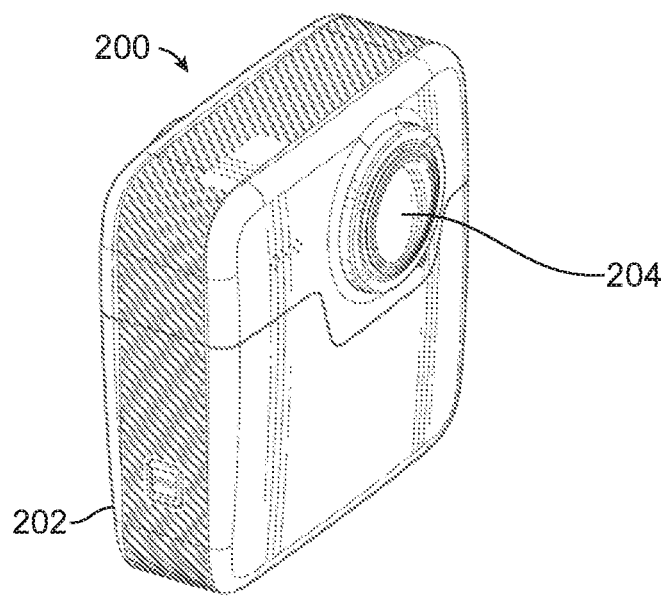
FIGS. 2A-B are isometric views of another example of an image capture device in accordance with embodiments of this disclosure.
Figure 2B:
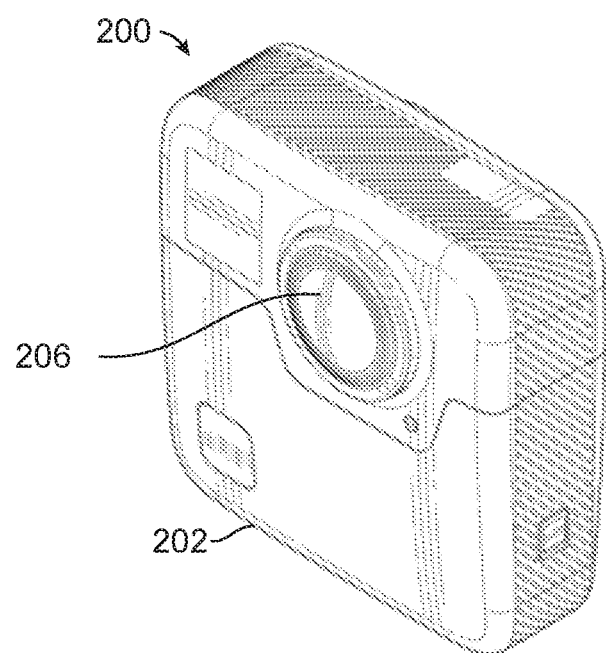

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
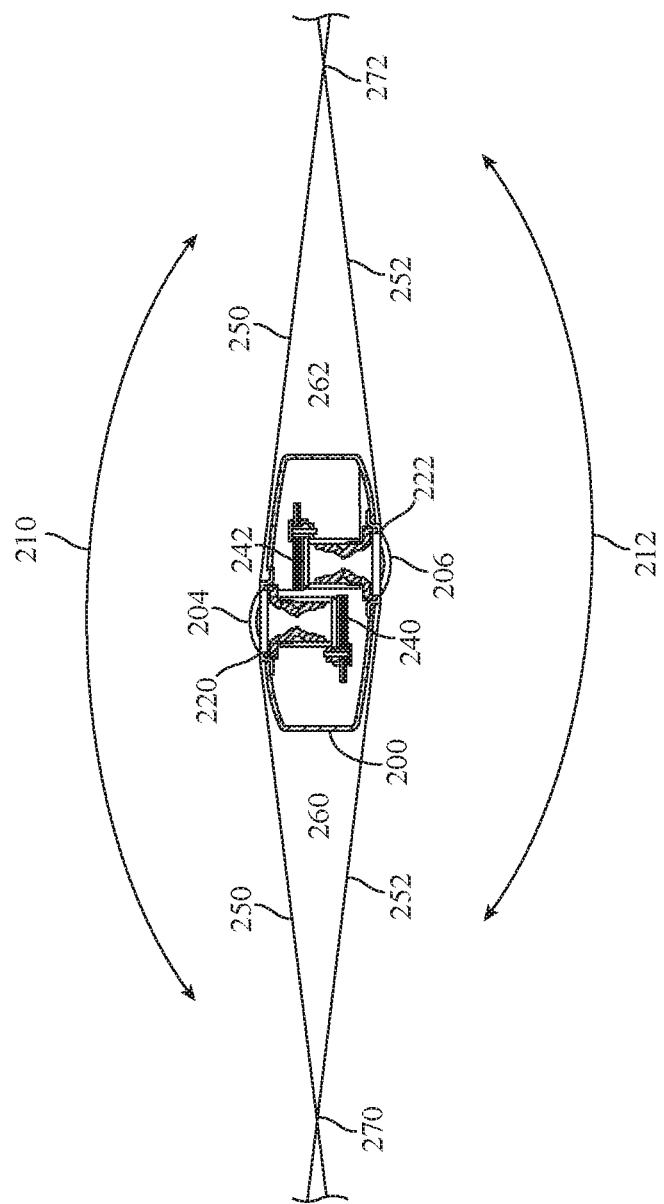
FIG. 2C is a cross-sectional view of the image capture device of FIGS. 2A-B in accordance with embodiments of this disclosure.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
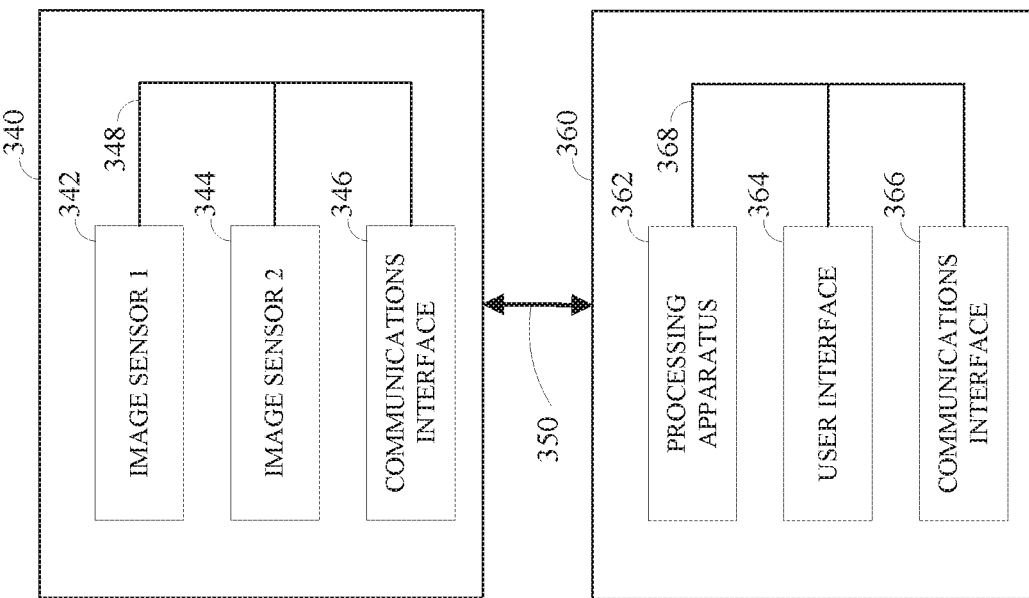
FIGS. 3A-B are block diagrams of examples of image capture systems in accordance with embodiments of this disclosure.
Figure 3A:
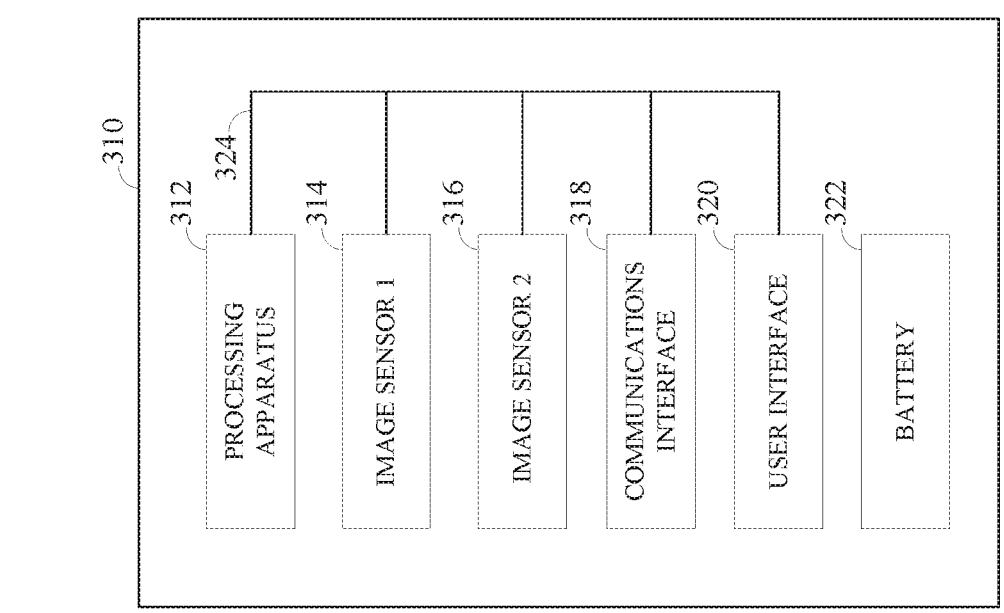

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may implement some or all of the techniques described in this disclosure, such as the techniques for anti-ghosting and fusion processing described with respect to FIGS. 4-7.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques described in this disclosure, such as the techniques for anti-ghosting and fusion processing described with respect to FIGS. 4-7.

Figure 4:
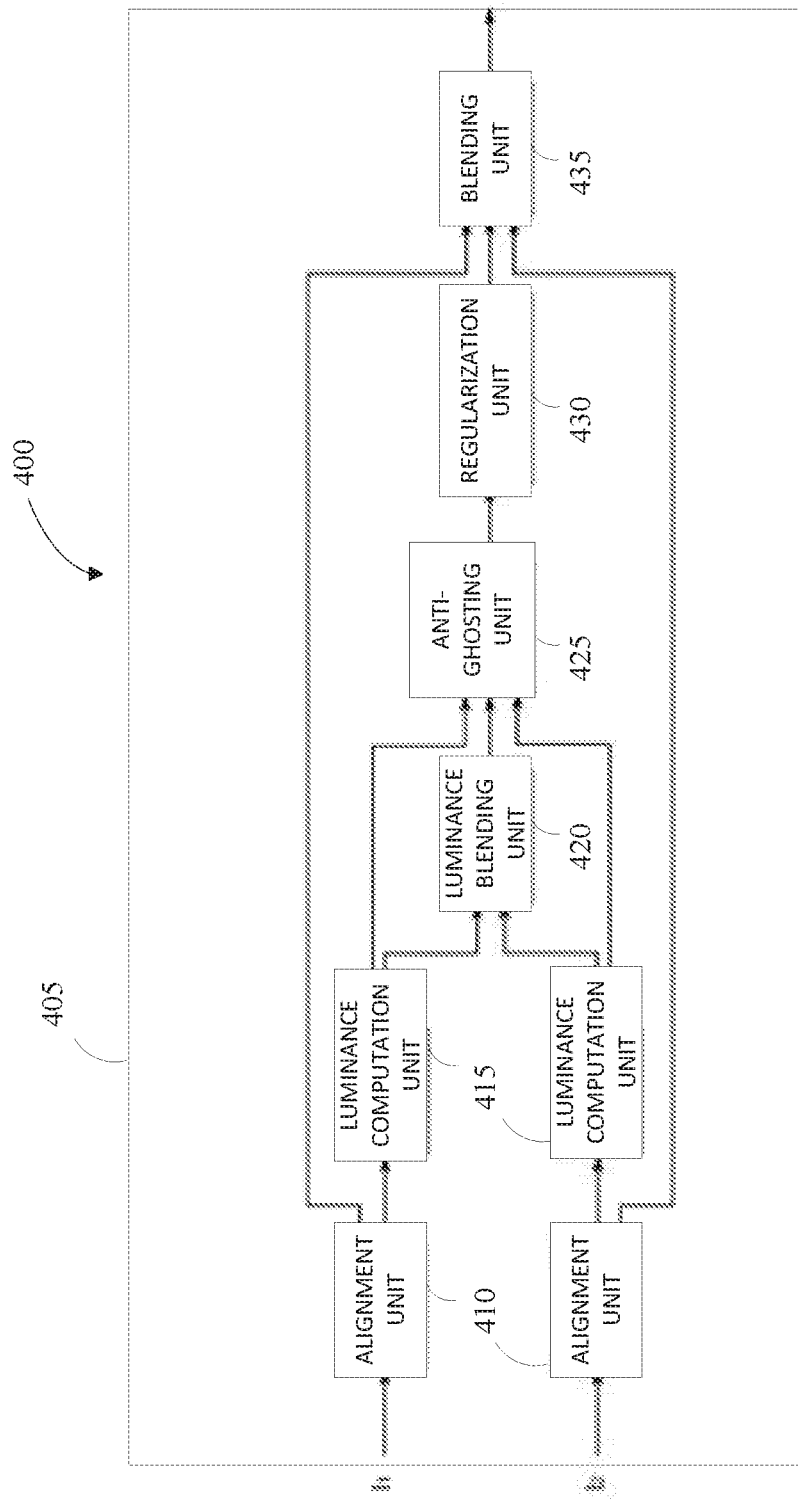
FIG. 4 is a functional block diagram of an example of an image processing pipeline in accordance with embodiments of this disclosure.

FIG. 4 is a block diagram of an example of an image processing pipeline 400 in accordance with implementations of this disclosure. In some implementations, the image processing pipeline 400 may be included in an image capture device, such as the image capture device 100 shown in FIGS. 1A-1D, the image capture device 200 shown in FIGS. 2A-2D or the image capture device 310 shown in FIGS. 3A-3B. In some implementations, the image processing 400 may include an image signal processor (ISP) 405.

The image signal processor 405 may receive multiple input image signals and output an output image. For example, image sensors (not shown), such as first image sensor 240 and second image sensor 242 shown in FIG. 2C, may each capture an image, or a portion thereof, and may send, or transmit, each captured image, or image portion, to the image signal processor 405 as the input image signals. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second. In an implementation, more than two image sensors may be used, each image sensor capturing an image, or a portion thereof, and may send, or transmit, each captured image, or image portion, to the image signal processor 405 as the input image signals.

The image signal processor 405 may include an alignment unit 410 for each input image $I_1$ and $I_2$, for example. The alignment unit 410 may operate in the linear domain or on linear color space images, where the input image signals are proportional to the quantity of light reaching each image sensor. In an implementation, the alignment unit 410 may operate on input images in the RGB color space. In an implementation, the alignment unit 410 may operate on the input image signals prior to gamma curve or tone mapping operations. The alignment unit 410 may align the input images based on luminance. In an implementation, a gain is applied to respective or appropriate input images so that the same objects in the input images with different exposure time or gain have the same grey level after the gain application.

The image signal processor 405 may include a luminance computation unit 415 for each input image. The luminance computation unit 415 may operate in the linear domain or on linear color space images, where the input image signals are proportional to the quantity of light reaching each image sensor. In an implementation, the luminance computation unit 415 may operate on input images in the RGB color space. In an implementation, the luminance computation unit 415 may compute the luminance values for each pixel in each of the input images. In an implementation, the luminance values may be computed as an average of the luminance values on each of the R, G and B color channels. In an implementation, the luminance values may be computed as a weighted average of the luminance values on each of the R, G and B color channels. In an implementation, the luminance values may be computed based on the luminance values on each of the R, G and B color channels.

The image signal processor 405 may include a luminance blending unit 420. The luminance blending unit 420 may operate in the linear domain or on linear color space images, where the input image signals are proportional to the quantity of light reaching each image sensor. In an implementation, the luminance blending unit 420 may operate on input images in the RGB color space. The luminance blending unit 420 may blend the luminance values and form a blended luminance input image.

The image signal processor 405 may include an anti-ghosting unit 425. The anti-ghosting unit 425 may operate in the linear domain or on linear color space images, where the input image signals are proportional to the quantity of light reaching each image sensor. In an implementation, the anti-ghosting unit 425 may operate on input images in the RGB color space.

The anti-ghosting unit 425 may apply an anti-ghosting function to the input images to determine the quantity of each input image to retain in the output HDR image. In an implementation, the anti-ghosting function 425 may output an anti-ghosting weight α for each pixel which determines the proportion of $I_1$ and the inverse proportion of $I_2$ in the output HDR image, for example.

In an implementation, the anti-ghosting function determines the value of α based on whether an image has a useful information or not (e.g. saturated areas of overexposed images may be excluded for instance) and whether images are consistent or not, (i.e. whether ghost artifacts exist in the images). In an implementation, the anti-ghosting function may be defined as a multi-variate function. For example, the multi-variate function may be stated in equation form as:

$$\alpha = f(Y, \delta Y) \text{ where } \delta Y = Y_1 - Y_2 \text{ and } Y \text{ represents luminance} \quad \text{Eq}(1)$$

The δY may be signed value and therefore may provide information on the relative exposure between the input images, i.e. indicate ghosting artifacts. The δY value at each pixel may be determined by obtaining the luminance differences between the input images. In an implementation, the δY value may be determined by subtracting the luminance values computed by each of the luminance computing units 415.

In an implementation, the gain values or factors used by the alignment unit 410 and the blended luminance input image from the luminance blending unit 420 may be used to determine a usefulness threshold to select which of the input images to use for the Y value or whether to perform a weighted average between the luminance values. In an implementation, a luminance value related to the underexposed image may be selected as the Y value. For example, the underexposed image may contain the full dynamic range and pertinent information for the pixel in contrast to the overexposed image, which may be oversaturated, clipped and contain little or no information. For example, the usefulness threshold may be used to replace overexposed image portions or pixels with underexposed image portions or pixels.

In an implementation, the multi-variate function α=f (Y, δY) may be implemented using a look-up table (LUT) which uses the Y value and the δY value as access parameters into the LUT to select, locate or determine the anti-ghosting weight α for a pixel. In an implementation, the LUT may be populated at exposure time. In an implementation, the number of entries in the LUT or the number of control points should be enough to provide flexibility in tuning but with respect to embeddability constraints, where the tuning may depend on the exposure steps between the input images. In an implementation, the number of entries in the LUT may be balanced between real-time functionality and degree of interpolation needed between the control points.

The image signal processor 405 may include a regularization unit 430. The regularization unit 430 may regularize or smooth the anti-ghosting weight α due to noise levels present in each of the input images. In an implementation, the regularization unit 430 may use low pass filters, bilinear filters which are edge aware, morpho-math filters and the like to prevent discrepancies or jumps due the noise levels when switching between the multiple input images. In an implementation, the anti-ghosting weight α is spatially regularized.

The image signal processor 405 may include a blending unit 435. The blending unit 435 may use the regularized anti-ghosting weight α to fuse the input images into the output HDR image. For example, for two input images, the image fusion may be stated in equation form as:

$$O = \alpha \times I_1 + (1-\alpha) \times I_2 \quad \text{Eq. (2)}$$

where the output is a proportion of $I_1$ and the inverse proportion of $I_2$ multiplied by the anti-ghosting weight α.

The image signal processor 405 may include other image signal processing units (not shown) including color correction units, tone mapping units and the like to process the output HDR image before storage, transmission or display.

Figure 5:
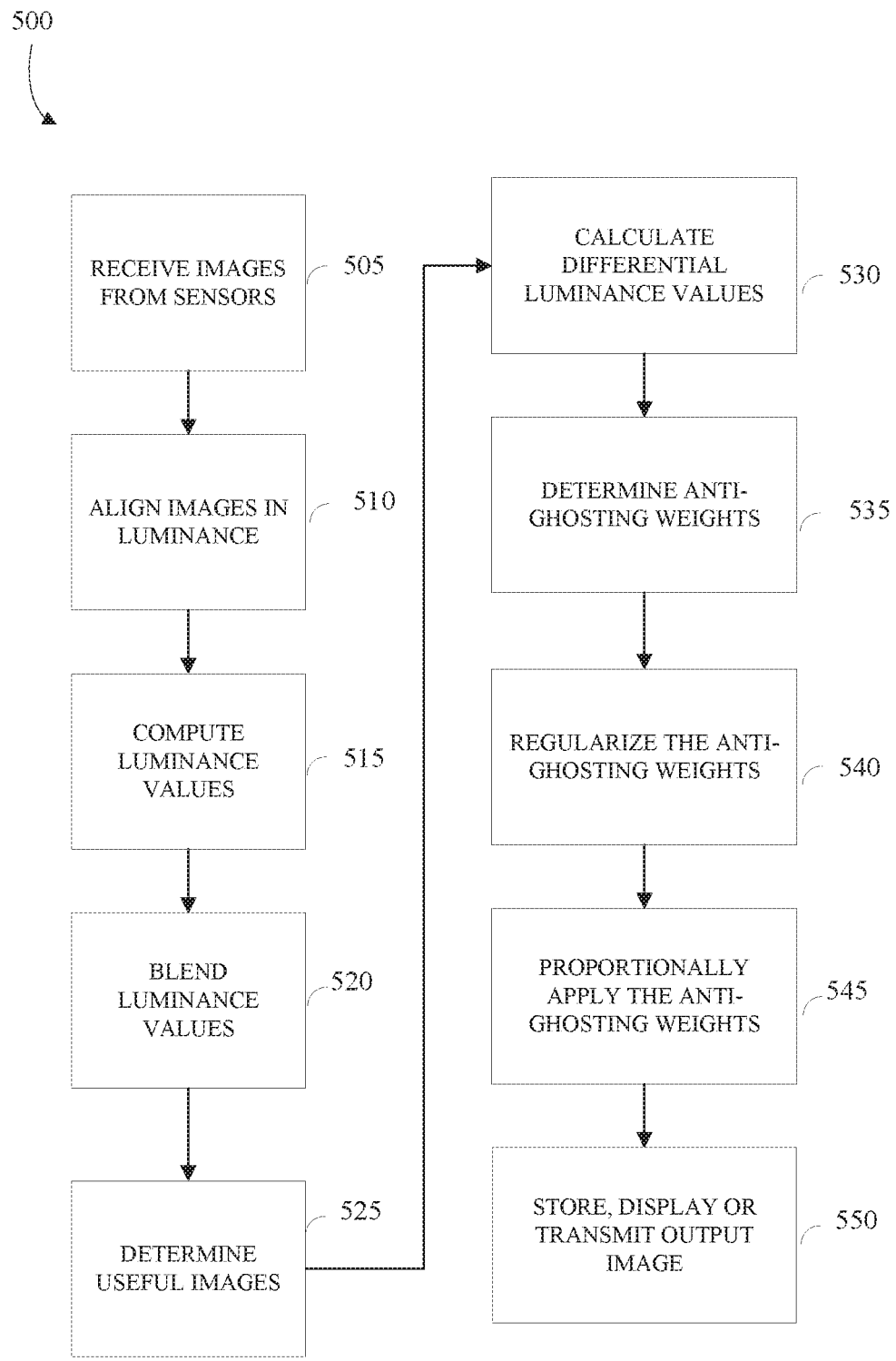
FIG. 5 is a flowchart of an example technique for high dynamic range anti-ghosting and fusion of captured images in accordance with embodiments of this disclosure.

FIG. 5 is a flowchart of an example technique 500 for performing high dynamic range anti-ghosting and fusion. The technique 500 includes: receiving 505 multiple images from image sensors in a linear color space or linear domain; aligning 510 in luminance by applying a gain so same objects with different exposure times have a same grey level; computing 515 luminance values for each pixel in each input image; blending 520 the luminance values at each pixel from each of the input images to generate a blended image; determining 525 an useful image by selecting which of the input images has useful information for a pixel; calculating 530 a differential luminance value between the input images for the pixel; determining 535 an anti-ghosting weight α based on the useful image and the differential luminance value for the pixel; regularizing 540 the anti-ghosting weight α for the pixel; applying 545 proportionally the anti-ghosting weight α to the pixel for each of the input images to generate an output image; and storing, displaying, or transmitting 550 an output image. For example, the technique 500 may be implemented by the image capture device 100 shown in FIGS. 1A-1D, the image capture device 200 shown in FIGS. 2A-2D or the image capture device 310 shown in FIGS. 3A-3B.

The technique 500 includes receiving 505 images from the image sensors. The image sensors may be part of an image capture apparatus (e.g., the image capture device 100, the image capture device 200, or the image capture device 310). In some implementations, the image sensors may be attached to a processing apparatus that implements the technique 500. For example, the images may be received 505 as input image signals, which may represent each pixel value in a defined format, such as in a RAW image format. In some implementations, the images may be frame of video, i.e., one of a sequence of images of a video. In some implementations, the images are received 505 directly from the image sensors without intermediate image processing. In some implementations, the images are received 505 after being subjected to intermediate image processing (e.g., correction of dead pixels, band processing, decoupling of vertical blanking, spatial noise reduction, and/or temporal noise reduction).

The technique 500 includes aligning 510 in luminance by applying a gain so same objects with different exposure times have a same grey level. The aligning 510 may be done in the linear domain before application of non-linear processing on the input images. In an implementation, each image may be captured with a different exposure time or gain. A gain factor may be applied to pixels or areas in one of the images so that same objects have a normalized grey level after the gain application.

The technique 500 includes computing 515 luminance values for each pixel in each of the input images. In an implementation, the computing 515 may be done in the linear domain before application of non-linear processing on the input images. The computing 515 may compute the luminance value by taking the average of the luminance values for the R, G and B channels. In an implementation, the computing 515 may compute the luminance value by using any representative metric for processing a set of numbers.

The technique 500 includes blending 520 the luminance values at each pixel from each of the input images to obtain a blended input. In an implementation, the blending 520 may be done in the linear domain before application of non-linear processing on the input images. In an implementation, the blended input is used to determine the anti-ghosting weight.

The technique 500 includes determining 525 a useful image by selecting which of the input images has useful information for a pixel. In an implementation, the determining 525 may be done in the linear domain before application of non-linear processing on the input images. In an implementation, the useful image represents the input image that has a greater or larger dynamic range for the pixel in question or being evaluated. In an implementation, selection of the useful image may be determined from a threshold based on the gain factor and the blended image. In an implementation, the luminance value for the pixel may be determined from the useful image. In an implementation, the useful image may be the underexposed image. In an implementation, the useful image may be represented by more than one input image. In an implementation, the luminance value for the pixel may be determined by averaging the luminance values from each of the input images.

The technique 500 includes calculating 530 a differential luminance value between the input images for the pixel. In an implementation, the calculating 530 may be done in the linear domain before application of non-linear processing on the input images. In an implementation, the differential luminance value may represent the degree of ghosting artifacts present in the pixel being evaluated. In an implementation, the differential luminance value may be calculated by subtracting the luminance values of the input images at the pixel.

The technique 500 includes determining 535 an anti-ghosting weight α based on the useful image and the differential luminance value for the pixel. In an implementation, the determining 535 may be done in the linear domain before application of non-linear processing on the input images. In an implementation, a LUT may be populated with anti-ghosting weights α at image exposure. For example, the number of entries in the LUT may be delimited by the degree of interpolation desired between entries and real-time execution. The LUT may be accessed by using the useful image and the differential luminance value for the pixel to locate the anti-ghosting weight α.

The technique 500 includes regularizing 540 the anti-ghosting weight α for the pixel. In an implementation, the regularizing 540 may be done in the linear domain before application of non-linear processing on the input images. In an implementation, the regularizing 540 mitigates spikes due to signal-to-noise variations between the input images when switching between the input images. In an implementation, the regularizing 540 may be done using filters which attenuate the noise levels of the input images. For example, the filters may include low-pass filters, bilinear filters, morpho-filters and the like.

The technique 500 includes applying 545 proportionally the anti-ghosting weight α to the pixel for each of the input images to generate an output image. In an implementation, the applying 545 may be done in the linear domain before application of non-linear processing on the input images. The applying 545 of the anti-ghosting weight α may quantify the amount of each input image retained in the output image.

The technique 500 includes storing, displaying, or transmitting 525 an output image. I an implementation, additional processing may be done prior to the storing, displaying, or transmitting 525 including applying tone mapping and the like.

Figure 6:
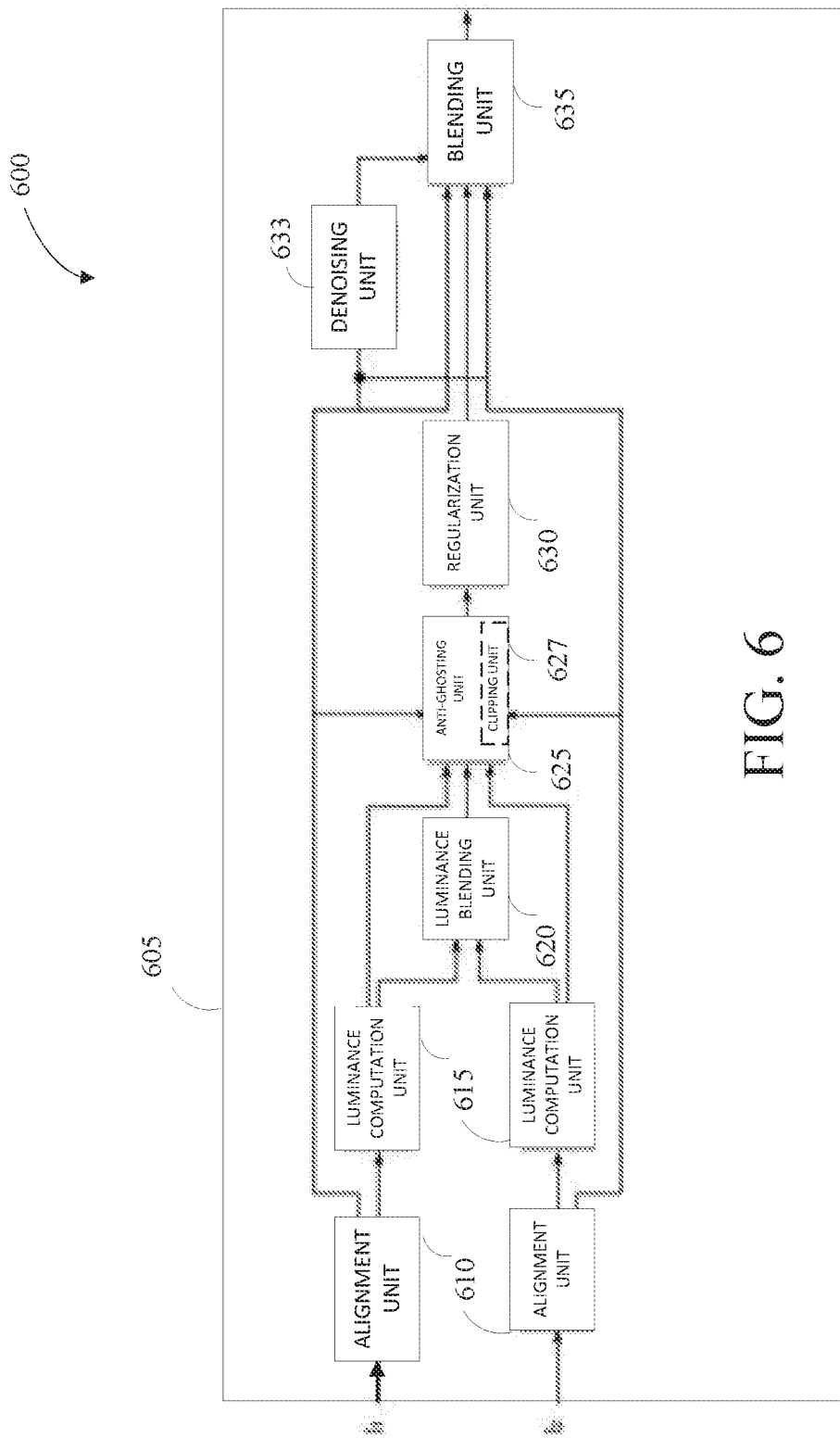
FIG. 6 is a functional block diagram of an example of an image processing pipeline in accordance with embodiments of this disclosure.

FIG. 6 is a block diagram of an example of an image processing pipeline 600 in accordance with implementations of this disclosure. In some implementations, the image processing pipeline 600 may be included in an image capture device, such as the image capture device 100 shown in FIGS. 1A-1D, the image capture device 200 shown in FIGS. 2A-2D or the image capture device 310 shown in FIGS. 3A-3B. In some implementations, the image processing 600 may include an image signal processor (ISP) 605.

The image signal processor 605 may receive multiple input image signals and output an output image. For example, image sensors (not shown), such as first image sensor 240 and second image sensor 242 shown in FIG. 2C, may each capture an image, or a portion thereof, and may send, or transmit, each captured image, or image portion, to the image signal processor 605 as the input image signals. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second. In an implementation, more than two image sensors may be used, each image sensor capturing an image, or a portion thereof, and may send, or transmit, each captured image, or image portion, to the image signal processor 605 as the input image signals.

The image signal processor 605 may include an alignment unit 610 for each input image $I_1$ and $I_2$, for example. The alignment unit 610 may operate in the linear domain or on linear color space images, where the input image signals are proportional to the quantity of light reaching each image sensor. In an implementation, the alignment unit 610 may operate on input images in the RGB color space. In an implementation, the alignment unit 610 may operate on the input image signals prior to gamma curve or tone mapping operations. The alignment unit 610 may align the input images based on luminance. In an implementation, a gain is applied to respective or appropriate input images so that the same objects in the input images with different exposure time or gain have the same grey level after the gain application.

The image signal processor 605 may include a luminance computation unit 615 for each input image. The luminance computation unit 615 may operate in the linear domain or on linear color space images, where the input image signals are proportional to the quantity of light reaching each image sensor. In an implementation, the luminance computation unit 615 may operate on input images in the RGB color space. In an implementation, the luminance computation unit 615 may compute the luminance values for each pixel in each of the input images. In an implementation, the luminance values may be computed as an average of the luminance values on each of the R, G and B color channels. In an implementation, the luminance values may be computed as a weighted average of the luminance values on each of the R, G and B color channels. In an implementation, the luminance values may be computed based on the luminance values on each of the R, G and B color channels.

The image signal processor 605 may include a luminance blending unit 620. The luminance blending unit 620 may operate in the linear domain or on linear color space images, where the input image signals are proportional to the quantity of light reaching each image sensor. In an implementation, the luminance blending unit 620 may operate on input images in the RGB color space. The luminance blending unit 620 may blend the luminance values and form a blended luminance input image.

The image signal processor 605 may include an anti-ghosting unit 625. The anti-ghosting unit 625 may operate in the linear domain or on linear color space images, where the input image signals are proportional to the quantity of light reaching each image sensor. In an implementation, the anti-ghosting unit 625 may operate on input images in the RGB color space.

The anti-ghosting unit 625 may apply an anti-ghosting function to the input images to determine the quantity of each input image to retain in the output HDR image. In an implementation, the anti-ghosting function 625 may output an anti-ghosting weight α for each pixel which determines the proportion of $I_1$ and the inverse proportion of $I_2$ in the output HDR image, for example.

In an implementation, the anti-ghosting function determines the value of a based on whether an image has a useful information or not (e.g. saturated areas of overexposed images may be excluded for instance) and whether images are consistent or not, (i.e. whether ghost artifacts exist in the images). In an implementation, the anti-ghosting function may be defined as a multi-variate function. For example, the multi-variate function may be stated in equation form as:

$$\alpha = f(Y, \text{Err}) \qquad \text{Eq(3)}$$

where Err is an error function computed as a distance between the images and the term Y represents luminance. The Err may be signed value and therefore may provide information on the relative exposure between the input images, i.e. indicate ghosting artifacts, and their similarity.

In an implementation, the Err value at each pixel may be determined by obtaining the luminance differences between the input images. In an implementation, the Err value may be determined by subtracting the luminance values computed by each of the luminance computing units 615.

In an implementation, the Err value at each pixel may be determined by obtaining a colorimetric difference with a $l_p$-norm (p being a parameter):

$$Err = \sqrt[p]{\sum_{c \in \{R,G,B\}} k_c \times |c_2 - c_1|^p} \qquad \text{Eq(4)}$$

where the $p^{th}$ root function being optional depending on cost constraints such as image quality, signal-to-noise ratio (SNR), and the like, and $k_c$ being a weight to adapt the relative contribution of each R, G and B channel (c), with $k_c$ being either a constant value or a function $k_c = g_c(c_{ref})$ that may depend on image quality, SNR and the like.

In an implementation, the Err value at each pixel may be determined by obtaining a normalized colorimetric difference with a $l_p$-norm (p being a parameter):

$$Err = \sqrt[p]{\sum_{c \in \{R,G,B\}} k_c \times \frac{|c_2 - c_1|^p}{\sigma(c_{ref})}} \qquad \text{Eq(5)}$$

where the $p^{th}$ root function being optional depending on cost constraints such as image quality, SNR, and the like, $c_{ref}$ being one of $c_1$ and $c_2$ and $\sigma(c_{ref})$ being the expected variance of the current pixel $c_{ref}$, and $k_c$ being a weight to adapt the relative contribution of each channel, with $k_c$ being either a constant value or a function $k_c = g_c(c_{ref})$ that may depend on image quality, SNR and the like. In this instance, the Err aims at normalizing the observed difference by the expected noise level so that tuning becomes independent of the noise level of the input images.

In an implementation, the Err value at each pixel may be determined by obtaining a normalized colorimetric difference with a $l_p$-norm (p being a parameter):

$$Err = \sqrt[p]{\sum_{c \in \{R,G,B\}} k_c \times \frac{|c_2 - c_1|^p}{c_{ref}}} \qquad \text{Eq(6)}$$

where the $p^{th}$ root function being optional depending on cost constraints such as image quality, SNR, and the like, $c_{ref}$ being one of $c_1$ and $c_2$, and $k_c$ being a weight to adapt the relative contribution of each channel, with $k_c$ being either a constant value or a function $k_c = g_c(c_{ref})$ (implemented for example as a look-up table) that may depend on image quality, SNR and the like. In this instance, the Err may be seen as a relative error that is independent of the grey level and that allows comparison to the expected noise level.

In an implementation, the Err value at each pixel may be determined by obtaining a normalized colorimetric difference with a $l_p$-norm (p being a parameter):

$$Err = \Sigma_{c \in \{R,G,B\}} |k_c \times (g(s_c \times c_{ref}) \times |(c_2 - c_1) \times s_c|^p - t(s_c \times c_{ref}))| \qquad \text{Eq(7)}$$

with the $p^{th}$ root function being optional depending on cost constraints such as image quality, SNR, and the like; $c_{ref}$ being one of $c_1$ and $c_2$; $k_c$ being a weight to adapt the relative contribution of each channel, with $k_c$ being either a constant value or a function $k_c = g_c(c_{ref})$ (implemented for example as a look-up table) that may depend on image quality, SNR and the like; $s_c$ being a constant value for each channel to compensate for linear color processing that may be applied before HDR fusion such as, for example but not limited to, white balance or digital gains; g(x) being a normalization function that is a function of a current reference value x aimed at normalizing the difference using the variance or the standard deviation; and t(x) being a function that enables tuning of the Err function by subtracting an amount that depends on a current pixel value. In an implementation, p∈{1, 2} is a parameter to choose between l1 and l2-norm.

As noted herein, the term $s_c$ accounts for any previously applied gain or processing that may change, for example, a noise model that may be otherwise be known. For example, if white balancing is applied, the noise model changes for each channel. By applying $s_c$ prior to normalization, the same g(x) function may be used for all channels since the same noise model is now applicable to all channels. The function t(x) tunes the Err function according to signal-to-noise ratio (SNR). That is, the Err function is artificially reduced to reduce the number of ghosts detected as a result or function of the noise. In other words, the t(x) function relates to how tolerant the Err function is to noise. For example, in areas with lots of noise, there is a greater amount of tolerance to ghost detection and in areas of low noise, there is less tolerance to ghost detection.

In an implementation, anti-ghosting unit 625 may include a clipping unit 627 which may operate on the gain applied image inputs, i.e. $I_{1,norm}=gain_1 \times I_1$ and $I_{2,norm}=gain_2 \times I_2$, prior to determination of the Err. In this instance, the input images may be clipped to the saturation value of the overexposed image in order to detect some of the ghosts in the saturated areas. For example, if $I_1$ is the overexposed image and $I_2$ is the underexposed image with a 1-stop difference, by aligning underexposed image on the overexposed image, this would obtain:

$$I_{1,norm}=I_1$$

$$I_{2,norm}=\min(2 \times I_2, 1.0)$$

Then, for all pixels in the underexposed image that corresponds to saturated pixels in the overexposed images this may distinguish: 1) pixels that would be saturated after exposure alignment; and 2) pixels that wouldn't be saturated after exposure alignment and therefore may show an inconsistency between images, underlining ghost areas.

In an implementation, the gain values or factors used by the alignment unit 610 and the blended luminance input image from the luminance blending unit 620 may be used to determine a usefulness threshold to select which of the input images to use for the Y value or whether to perform a weighted average between the luminance values. In an implementation, a luminance value related to the underexposed image may be selected as the Y value. For example, the underexposed image may contain the full dynamic range and pertinent information for the pixel in contrast to the overexposed image, which may be oversaturated, clipped and contain little or no information. For example, the usefulness threshold may be used to replace overexposed image portions or pixels with underexposed image portions or pixels. In an implementation, when both images are similar, the Y value may be selected from signal that has the best SNR. In an implementation, for saturated areas, if there are no inconsistencies between the input images, the Y value may be selected from the underexposed image. In an implementation, where there are discrepancies between the input images, a reference image may be defined from which information has to be taken using known or new techniques. For example, using an underexposed image having the most information or determining locally the best image in ghosted areas given several criteria such as movement, SNR, neighborhood information and the like.

In an implementation, the multi-variate function $\alpha=f(Y, Err)$ may be implemented using a look-up table (LUT) which uses the Y value and the Err value as access parameters into the LUT to select, locate or determine the anti-ghosting weight $\alpha$ for a pixel. In an implementation, the LUT may be populated at exposure time. In an implementation, the number of entries in the LUT or the number of control points should be enough to provide flexibility in tuning but with respect to embeddability constraints, where the tuning may depend on the exposure steps between the input images and the noise model of each input image. In an implementation, the number of entries in the LUT may be balanced between real-time functionality and degree of interpolation needed between the control points.

Figure 8A:
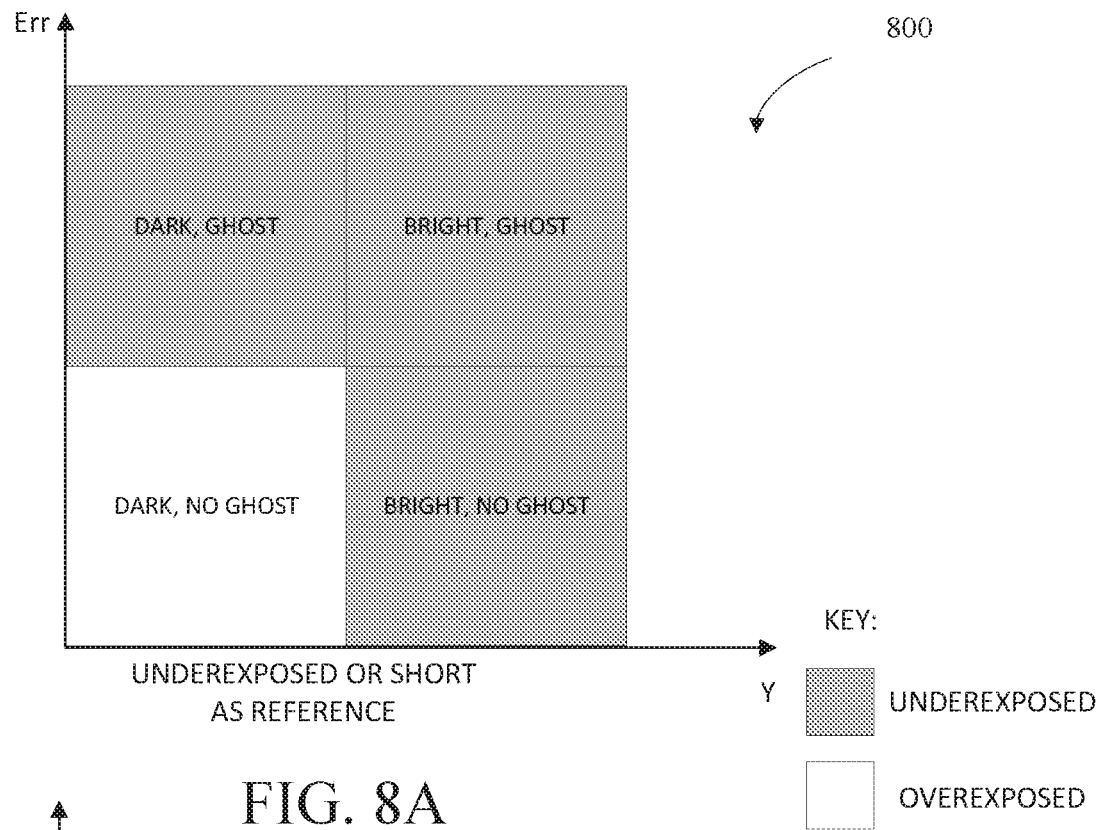
FIGS. 8A and 8B are diagrams of examples of tuning of a LUT with different reference images.
Figure 8B:
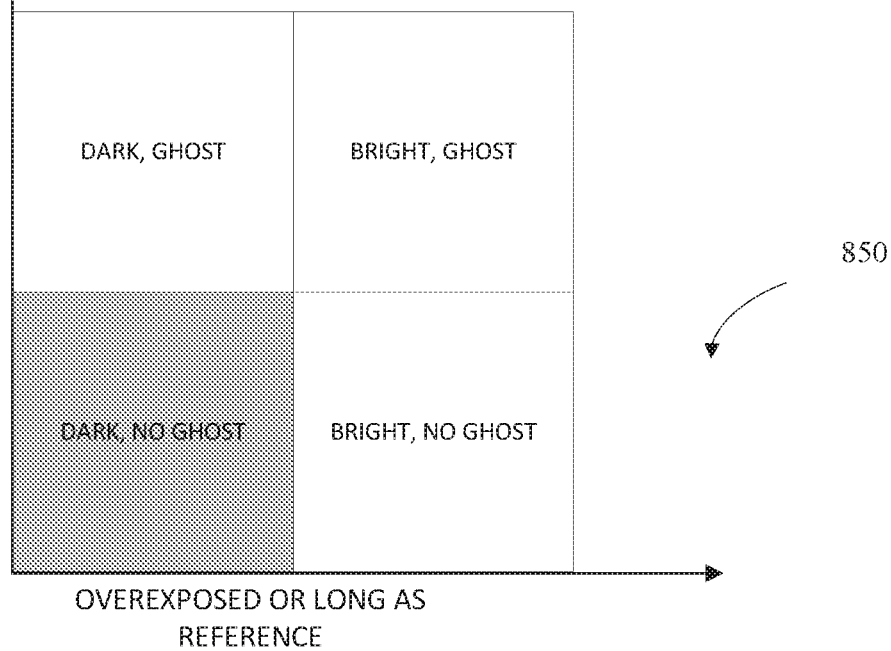

FIGS. 8A and 8B are diagrams of examples of tuning a 2D LUT with different reference images in accordance with embodiments of this disclosure. FIG. 8A is a diagram 800 of an underexposed image 800 as a function of luminance (Y) and the anti-ghosting Err function output, and FIG. 8B is a diagram of an overexposed image 850 as a function of luminance (Y) and the anti-ghosting Err function output. Selection between the underexposed image 800 and the overexposed image 850 as a reference image (the image from which a Y value may be selected, for example) is a trade-off between SNR and spatial coherence between detected ghosts. The underexposed image 800 provides better spatial coherence at the cost of SNR and the overexposed image 850 provides better SNR at the cost of spatial coherency. In an implementation, switching between the underexposed image 800 and the overexposed image 850 may be dependent on SNR, motion detection, and/or other like parameters that relate to image quality (IQ).

In an implementation, the underexposed image 800 of FIG. 8A may be used as the reference image. In this implementation, the overexposed image (for example, overexposed image 850) is used in areas which are dark and there are no ghosts. In the remaining areas, the underexposed image 800 will be used for the Y value, for example.

In an implementation, the overexposed image 850 of FIG. 8B may be used as the reference image. In this implementation, the underexposed image (for example, underexposed image 800) is used in areas which are dark and there are no ghosts. In the remaining areas, the overexposed image 850 will be used for the Y value, for example.

Referring back to FIG. 6, as described herein, the gain values or factors used by the alignment unit 610 and the blended luminance input image from the luminance blending unit 620 may be used to determine a usefulness threshold to select which of the input images to use for the Y value or whether to perform a weighted average between the luminance values. In an implementation, a luminance value related to the underexposed image may be selected as the Y value. For example, the underexposed image may contain the full dynamic range and pertinent information for the pixel in contrast to the overexposed image, which may be oversaturated, clipped and contain little or no information. For example, the usefulness threshold may be used to replace overexposed image portions or pixels with underexposed image portions or pixels. In an implementation, when both images are similar, the Y value may be selected from signal that has the best SNR. In an implementation, for saturated areas, if there are no inconsistencies between the input images, the Y value may be selected from the underexposed image. In an implementation, where there are discrepancies between the input images, a reference image may be defined from which information has to be taken using known or new techniques. For example, using an underexposed image having the most information or determining locally the best image in ghosted areas given several criteria such as movement, SNR, neighborhood information and the like.

Figure 9:
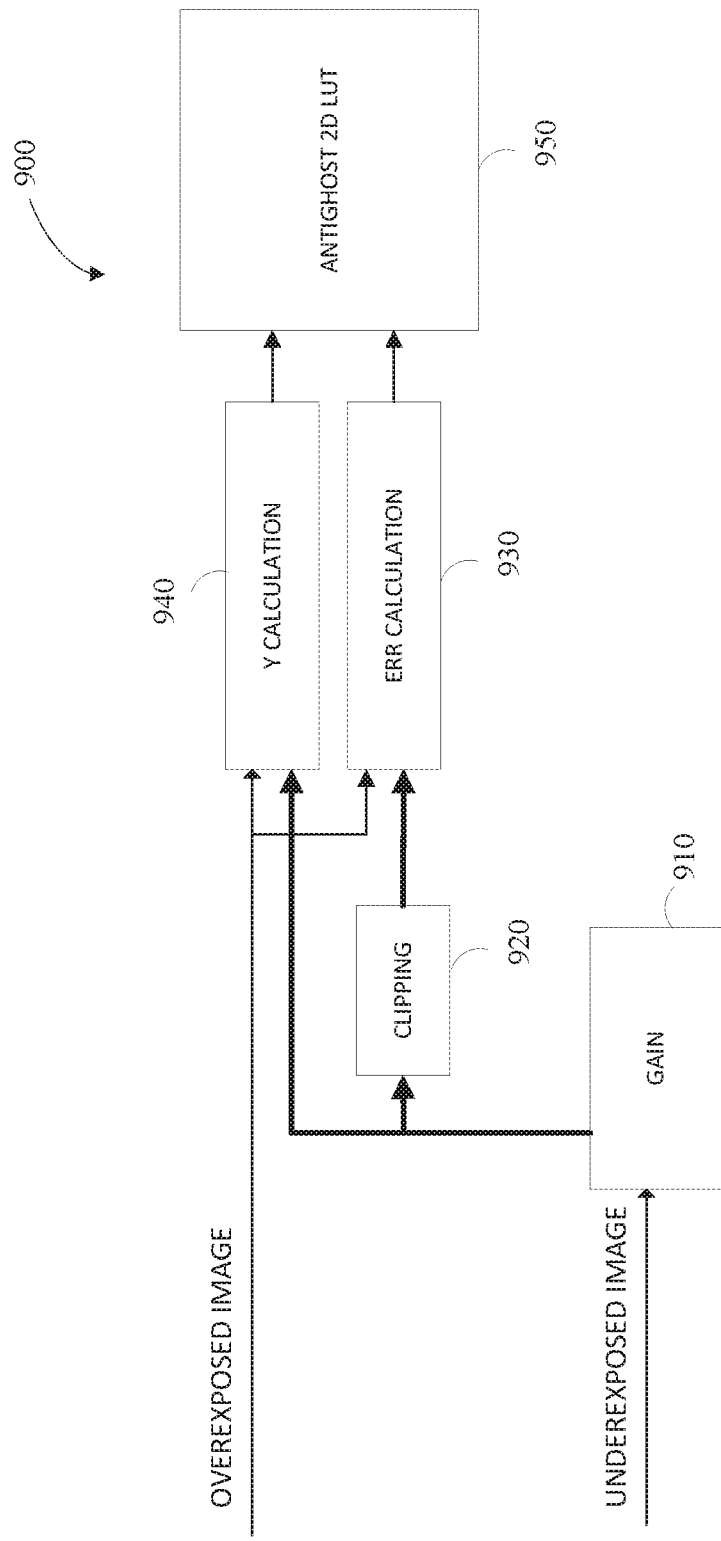
FIG. 9 is a functional flowchart of an example technique for determining inputs for a LUT in accordance with embodiments of this disclosure.

FIG. 9 is a functional flowchart of an example technique 900 for determining inputs for a LUT in accordance with embodiments of this disclosure. A gain 910 may be applied to an underexposed image to align the underexposed image with the overexposed image so that the same objects in the two input images with different exposure time or gain have the same grey level after the gain application. The gain applied underexposed image may be clipped 920 prior to Err calculation 930. In this instance, the gain applied underexposed image may be clipped to the saturation value of the overexposed image in order to detect some of the ghosts in the saturated areas. Then, for all pixels in the underexposed image that correspond to saturated pixels in the overexposed image this may distinguish: 1) pixels that would be saturated after exposure alignment; and 2) pixels that wouldn't be saturated after exposure alignment and therefore may show an inconsistency between images, underlining ghost areas. The Y and Err values are then used as inputs to anti-ghost 2D LUT 950.

Referring back to FIG. 6, the image signal processor 605 may include a regularization unit 630. The regularization unit 630 may regularize or smooth the anti-ghosting weight α due to noise levels present in each of the input images. In an implementation, the regularization unit 630 may use one or more of low pass filters, bilinear filters which are edge aware, morpho-math filters and the like to prevent discrepancies or jumps due the noise levels when switching between the multiple input images. In an implementation, the anti-ghosting weight α is spatially regularized.

Figure 10:
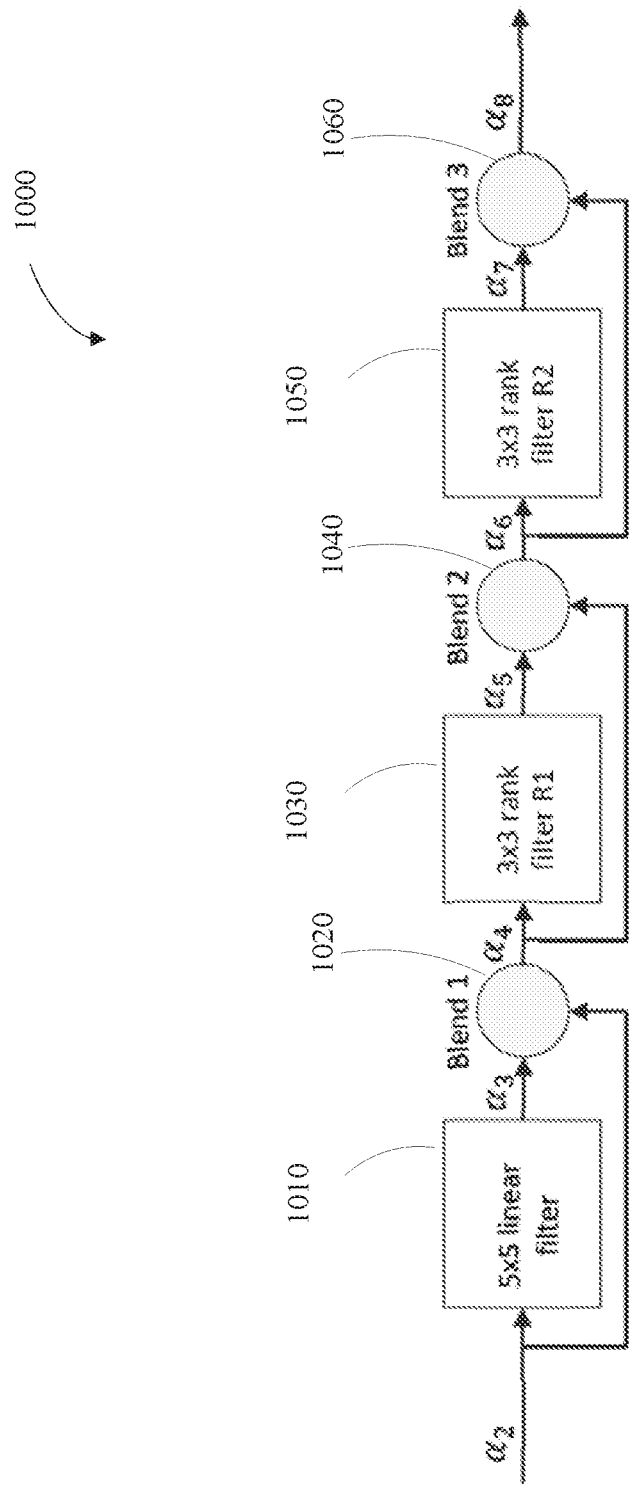
FIG. 10 is a block diagram of an example of a regularization unit in accordance with embodiments of this disclosure.

FIG. 10 is a block diagram of an example of a regularization unit 1000 for a spatial regularization in accordance with embodiments of this disclosure. In an implementation, the regularization unit 1000 may include a linear filter 1010 connected to a first blender 1020, which in turn is connected to a first rank filter 1030. The first rank filter 1030 is connected to a second blender 1040, which in turn is connected to a second rank filter 1050. The second rank filter 1050 is connected to a third blender 1060 and so on. In an implementation, the linear filter 1010 is a 5×5 linear filter. In an implementation, the linear filter 1010 is a 5×5 Gaussian filter with parameter σ (separable). In an implementation, the linear filters may be used to smooth the anti-ghosting weights. In an implementation, each of blenders 1020, 1040 and 1060 may be a blender with a parameter $Q_k$, where k∈{1, 2, 3}. In an implementation, first rank filter 1030 and the second rank filter 1050 are 3×3 rank filters. In an implementation, each of rank filters 1030 and 1050 is a rank filter with a rank $R_k$, where k∈{1, 2} ($R_k$=1 is minimum, $R_k$=5 is median, $R_k$=9 is maximum). In an implementation, the rank filters may be used to clean the images of false detections and/or outliers. In an implementation, the pair of rank filters collectively result in the image retaining initial boundaries but with false detections and/or outliers being eliminated. The number of linear filters and rank filters is illustrative and can vary depending on cost constraints, cost to image quality (IQ) compromise, application, configuration, computation resources and the like. The size of the linear filters and rank filters is illustrative and can vary depending on cost constraints, cost to image quality (IQ) compromise, application, configuration, computation resources and the like.

Operationally, the input to the linear filter 1010 is an anti-ghosting weight $α_2$, for example, and an output is an anti-ghosting weight $α_3$. For example, $α_3$=LPF2($α_2$, σ), where LPF2 is a 5×5 Gaussian filter with parameter a. The input and output of the linear filter 1010 are inputs to the first blender 1020. The output of the first blender 1020 is an anti-ghosting weight $α_4$ which is a blend of anti-ghosting weights $α_2$ and $α_3$, for example. In general, the output of each blender may be expressed as $α_n = Q_k × α_{n-1} + (1-Q_k) × α_{n-2}$, where each blender is a blender with parameter $Q_k$, k∈{1, 2, 3}. The input to the first rank filter 1030 is the anti-ghosting weight $α_4$ (the output of the first blender 1020) and the output is an anti-ghosting weight $α_5$. In general, the output of each rank filter can be expressed as $α_n$=Rank($α_{n-1}$, $R_k$), where each rank filter is a 3×3 rank filter with rank $R_k$, where k∈{1, 2} ($R_k$=1 is minimum, $R_k$=5 is median, $R_k$=9 is maximum). In the illustrative example, the output of the second blender 1040 is an anti-ghosting weight $α_6$ which is a blend of anti-ghosting weights $α_4$ and $α_5$, the input to the second rank filter 1050 is the anti-ghosting weight $α_6$ (the output of the second blender 1040) and the output is an anti-ghosting weight $α_7$, and the output of the third blender 1060 is an anti-ghosting weight $α_8$ which is a blend of anti-ghosting weights $α_6$ and $α_7$, for example.

Referring back to FIG. 6, the image signal processor 605 may include a blending unit 635. The blending unit 635 may use the regularized anti-ghosting weight α to fuse the input images into the output HDR image. For example, for two input images, the image fusion may be stated in equation form as:

$$O = α × I_1 + (1-α) × I_2 \qquad \text{Eq. (8)}$$

where the output is a proportion of $I_1$ and the inverse proportion of $I_2$ multiplied by the anti-ghosting weight α.

In an implementation, the image signal processor 605 may include a denoising unit 633. The denoising unit 633 may be added to the processing of the underexposed image to compensate for the SNR differences between the input images. The denoising strength may depend on one or more of the following factors. The denoising strength may depend on the grey level, where the denoising strength may be stronger in the darker areas (more noise) and lighter in the bright areas (less noise). The denoising strength may depend on the blending weights, i.e. the anti-ghosting weight α. The denoising strength may depend on the fusion transitions from underexposed to overexposed areas to smooth the SNR transition at the frontier of the blending between the images. In an implementation, if the denoising strength may not be set dynamically within the denoising unit, a blend between the input and the output of the denoiser unit may be performed according to the factors described herein. In an implementation, the denoising unit may be a low pass filter, a complex non-linear filtering technique (Nl-means, BM3D, Nl-bayes, and the like) depending on cost constraints.

The image signal processor 605 may include other image signal processing units (not shown) including color correction units, tone mapping units and the like to process the output HDR image before storage, transmission or display.

Figure 7:
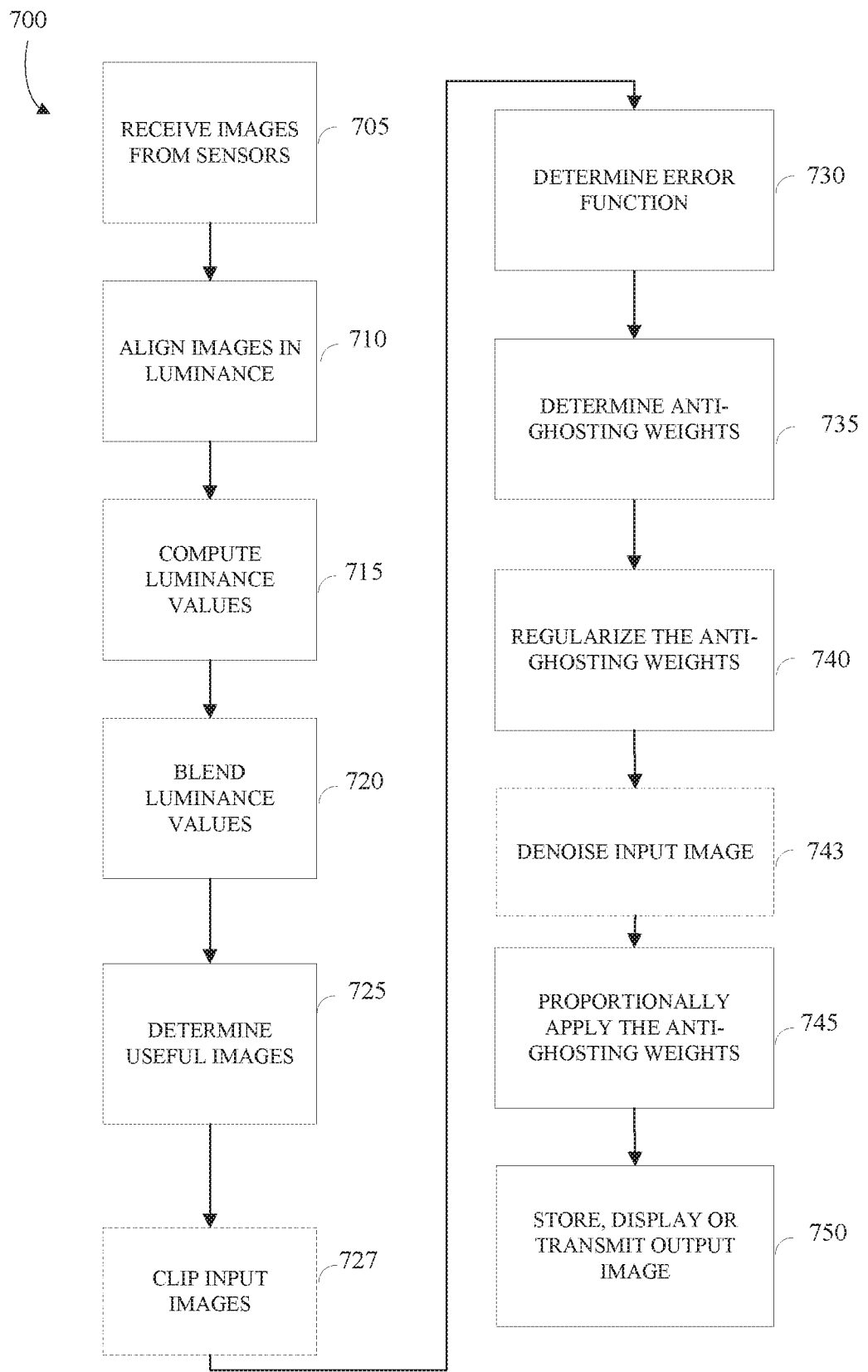
FIG. 7 is a flowchart of an example technique for high dynamic range anti-ghosting and fusion of captured images in accordance with embodiments of this disclosure.

FIG. 7 is a flowchart of an example technique 700 for performing high dynamic range anti-ghosting and fusion. The technique 700 includes: receiving 705 multiple images from image sensors in a linear color space or linear domain; aligning 710 in luminance by applying a gain so the same objects with different exposure times have a same grey level; computing 715 luminance values for each pixel in each input image; blending 720 the luminance values at each pixel from each of the input images to generate a blended image; determining 725 a useful image by selecting which of the input images has useful information for a pixel; clipping 727 input images in some implementations; calculating 730 an error function value between the input images for the pixel; determining 735 an anti-ghosting weight α based on the useful image and the error function value for the pixel; regularizing 740 the anti-ghosting weight α for the pixel; denoising 743 an underexposed image in certain implementations; applying 745 proportionally the anti-ghosting weight α to the pixel for each of the input images to generate an output image; and storing, displaying, or transmitting 750 an output image. For example, the technique 700 may be implemented by the image capture device 100 shown in FIGS. 1A-1D, the image capture device 200 shown in FIGS. 2A-2D or the image capture device 310 shown in FIGS. 3A-3B.

The technique 700 includes receiving 705 images from the image sensors. The image sensors may be part of an image capture apparatus (e.g., the image capture device 100, the image capture device 200, or the image capture device 310). In some implementations, the image sensors may be attached to a processing apparatus that implements the technique 700. For example, the images may be received 705 as input image signals, which may represent each pixel value in a defined format, such as in a RAW image format. In some implementations, the images may be a frame of video, i.e., one of a sequence of images of a video. In some implementations, the images are received 705 directly from the image sensors without intermediate image processing. In some implementations, the images are received 705 after being subjected to intermediate image processing (e.g., correction of dead pixels, band processing, decoupling of vertical blanking, spatial noise reduction, and/or temporal noise reduction).

The technique 700 includes aligning 710 in luminance by applying a gain so same objects with different exposure times have a same grey level. The aligning 710 may be done in the linear domain before application of non-linear processing on the input images. In an implementation, each image may be captured with a different exposure time or gain. A gain factor may be applied to pixels or areas in one of the images so that same objects have a normalized grey level after the gain application.

The technique 700 includes computing 715 luminance values for each pixel in each of the input images. In an implementation, the computing 715 may be done in the linear domain before application of non-linear processing on the input images. The computing 715 may compute the luminance value by taking the average of the luminance values for the R, G and B channels. In an implementation, the computing 715 may compute the luminance value by using any representative metric for processing a set of numbers.

The technique 700 includes blending 720 the luminance values at each pixel from each of the input images to obtain a blended input. In an implementation, the blending 720 may be done in the linear domain before application of non-linear processing on the input images. In an implementation, the blended input is used to determine the anti-ghosting weight.

The technique 700 includes determining 725 a useful image by selecting which of the input images has useful information for a pixel. In an implementation, the determining 725 may be done in the linear domain before application of non-linear processing on the input images. In an implementation, the useful image represents the input image that has a greater or larger dynamic range for the pixel in question or being evaluated. In an implementation, selection of the useful image may be determined from a threshold based on the gain factor and the blended image. In an implementation, the luminance value for the pixel may be determined from the useful image. In an implementation, the useful image may be the underexposed image. In an implementation, the useful image may be represented by more than one input image. In an implementation, the luminance value for the pixel may be determined by averaging the luminance values from each of the input images. In an implementation, the useful image may be selected from the image that has the best SNR. In an implementation, the useful image may be determined from a reference image defined using known or new techniques such as using the underexposed image having the most information or determining locally the best image in ghosted areas given several criteria such as movement, SNR, neighborhood information and the like.

The technique 700 optionally includes clipping 727 the input images to the saturation value of the overexposed image to detect ghosting artifacts in saturated areas.

The technique 700 includes calculating 730 an error function value or a distance value between the input images for the pixel. In an implementation, the calculating 730 may be done in the linear domain before application of non-linear processing on the input images. In an implementation, the differential luminance value may represent the degree of ghosting artifacts present in the pixel being evaluated. In an implementation, the differential luminance value may be calculated by subtracting the luminance values of the input images at the pixel. In an implementation, the distance value may be based on colorimetric differences. In an implementation, the distance value may be based on normalized colorimetric differences.

The technique 700 includes determining 735 an anti-ghosting weight $\alpha$ based on the useful image and the distance value for the pixel. In an implementation, the determining 735 may be done in the linear domain before application of non-linear processing on the input images. In an implementation, a LUT may be populated with anti-ghosting weights $\alpha$ at image exposure. For example, the number of entries in the LUT may be delimited by the degree of interpolation desired between entries and real-time execution. The LUT may be accessed by using the useful image and the distance value for the pixel to locate the anti-ghosting weight $\alpha$.

The technique 700 includes regularizing 740 the anti-ghosting weight $\alpha$ for the pixel. In an implementation, the regularizing 740 may be done in the linear domain before application of non-linear processing on the input images. In an implementation, the regularizing 740 mitigates spikes due to signal-to-noise variations between the input images when switching between the input images. In an implementation, the regularizing 740 may be done using filters which attenuate the noise levels of the input images. For example, the filters may include one or more of low-pass filters, bilinear filters, morpho-filters and the like.

The technique 700 optionally includes denoising 743 the underexposed input image to compensate between SNR difference between the input images. In an implementation, the denoising 743 may be done in the linear domain before application of non-linear processing on the input images. The strength of the denoising may be depend on the anti-ghosting weight, the grey level value, transition areas or combinations thereof.

The technique 700 includes applying 745 proportionally the anti-ghosting weight a to the pixel for each of the input images to generate an output image. In an implementation, the applying 745 may be done in the linear domain before application of non-linear processing on the input images. The applying 745 of the anti-ghosting weight $\alpha$ may quantify the amount of each input image retained in the output image.

The technique 700 includes storing, displaying, or transmitting 725 an output image. In an implementation, additional processing may be done prior to the storing, displaying, or transmitting 725 including applying tone mapping and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving input images from image sensors in a linear domain, each input image having a different exposure time;
aligning, in the linear domain, in luminance by applying a gain factor to appropriate input images so same objects with different exposure times have a same grey level;
blending, in the linear domain, luminance values at each pixel from each of the aligned images to generate a blended image;
determining, in the linear domain, a useful image by selecting which of the aligned images has useful information for a pixel based on luminance properties;
calculating, in the linear domain, one of a differential luminance value or a distance value from the aligned images for the pixel;
determining, in the linear domain, an anti-ghosting weight based on the useful image and the one of the differential luminance value or the distance value for the pixel;
applying, in the linear domain, proportionally the determined anti-ghosting weight to the pixel for each of the aligned images to generate an output image; and
storing, displaying, or transmitting the output image based on at least the anti-ghosting weight.

2. The method of claim 1, the method further comprising:
regularizing, in the linear domain, the anti-ghosting weight for the pixel.

3. The method of claim 1, the method further comprising:
computing the luminance values for each pixel in each aligned image.

4. The method claim 1, wherein the useful image represents the aligned image that has a largest dynamic range for the pixel.

5. The method of claim 1, wherein when the useful image is multiple aligned images, the method further comprising:
averaging luminance values from each of the aligned images.

6. The method of claim 1, wherein a presence of ghost artifacts is based on colorimetric properties of the aligned images.

7. The method of claim 1, wherein the determining, in the linear domain, an anti-ghosting weight further comprising:
accessing a look-up table (LUT) using a luminance value from the useful image and the one of the differential luminance value or the distance value to locate the anti-ghosting weight.

8. The method of claim 7, the method further comprising:
populating the LUT with anti-ghosting weights during image exposure.

9. The method of claim 7, wherein a number of entries in the LUT are delimited by a defined degree of interpolation between entries and real-time execution.

10. The method of claim 1, the method further comprising:
clipping the input images to a saturation value of an overexposed input image.

11. The method of claim 1, the method further comprising:
denoising an underexposed input image to account for signal-to-noise fluctuations with an overexposed input image.

12. The method of claim 1, wherein the distance value is based on luminance properties of the input images.

13. The method of claim 1, wherein the distance value is based on colorimetric properties of the input images.

14. A system, comprising:
image sensor configured to capture images; and
an image processor configured to receive the captured images and comprised of:
an alignment unit configured to, in the linear domain, align input images by applying a gain factor to appropriate input images so same objects with different exposure times have a same grey level;
a luminance blending unit configured to, in the linear domain, blend luminance values at each pixel from each of the aligned images to generate a blended image;
an anti-ghosting unit configured to, in the linear domain, determine an anti-ghosting weight based on a useful image and a differential luminance value for a pixel, wherein the useful image is determined by selecting which of the aligned images has useful information based on a luminance property and the differential luminance value is calculated from the luminance values of the aligned images; and
a blending unit configured to, in the linear domain, use the anti-ghosting weight to fuse the aligned images into an output high dynamic range image; and
the image processor further configured to store, display, or transmit the output high dynamic range image based on at least the anti-ghosting weight.

15. The system of claim 14, the image processor further comprising:
a look-up table (LUT), the look-up table including anti-ghosting weights, wherein the anti-ghosting unit is further configured to access the LUT using a luminance value associated with the useful image and the differential luminance value to locate the anti-ghosting weight.

16. The system of claim 15, wherein the useful image represents an aligned image that has a largest dynamic range for the pixel.

17. The system of claim 15, wherein when the useful image is multiple aligned images, the image processor further configured to:
average luminance values from the aligned images.

18. An image capture device, comprising:
image sensors configured to capture images; and
an image processor configured to receive the captured images and comprised of:
an alignment unit configured to, in the linear domain, align input images by applying a gain factor to appropriate input images so same objects with different exposure times have a same grey level;
a luminance blending unit configured to, in the linear domain, blend luminance values at each pixel from each of the aligned images to generate a blended image;
an anti-ghosting unit configured to, in the linear domain, determine an anti-ghosting weight based on a useful image and a distance value for a pixel, wherein the useful image is determined by selecting which of the aligned images has useful information using a luminance property and the distance value is calculated from defined image properties of the aligned images; and a blending unit configured to, in the linear domain, use the anti-ghosting weight to fuse the aligned images into an output high dynamic range image; and the image processor further configured to store, display, or transmit the output high dynamic range image based on at least the anti-ghosting weight.

19. The system of claim 18, the image processor further comprising:

a look-up table (LUT), the look-up table including anti-ghosting weights, wherein the anti-ghosting unit is further configured to access the LUT using a luminance value associated with the useful image and the distance value to locate the anti-ghosting weight.

20. The image capture device of claim 18, the image processor further comprising:

a regularization unit configured to spatially regularize anti-ghosting weights, the regularization unit including a combination of linear filters, rank filters, and blenders.

* * * * *